United States Patent

[11] 3,626,301

[72] Inventor Jean A. Develet, Jr.
Palos Verdes Peninsula, Calif.
[21] Appl. No. 39,331
[22] Filed May 21, 1970
[45] Patented Dec. 7, 1971
[73] Assignee TRW Inc.
Redondo Beach, Calif.

[54] BAND-PASS PHASE-LOCK RECEIVER
11 Claims, 6 Drawing Figs.

[52] U.S. Cl. .......... 325/420, 325/422, 325/433, 329/122, 329/50, 340/186, 340/187, 340/207, 331/43
[51] Int. Cl. .......... H04b 1/26
[50] Field of Search .......... 325/346, 416–423, 433; 329/122, 50; 331/13, 23, 32, 36, 43; 340/186, 187, 207

[56] References Cited
UNITED STATES PATENTS

| | | | |
|---|---|---|---|
| 2,368,643 | 2/1945 | Crosby | 325/422 |
| 3,388,331 | 6/1968 | Rawby | 325/420 |
| 3,364,311 | 1/1968 | Parker | 325/420 |

*Primary Examiner*—Robert L. Griffin
*Assistant Examiner*—Albert J. Mayer
*Attorneys*—Daniel T. Anderson, Harry T. Jacobs and Gerald Singer

ABSTRACT: A band-pass phase-lock loop receiver which can receive phase or frequency modulated signals in the presence of noise at lower signal power levels than conventional low-pass phase-lock loops. The circuit includes a plurality of band-pass filters, one for each discrete portion of the spectrum, in addition to the single low-pass filter found in conventional phase-lock loops.

PRIOR ART

INVENTOR
Jean A. Develet Jr.
BY
ATTORNEY

INVENTOR.
Jean A. Develet Jr.
BY Harry J. Jacobs
ATTORNEY

BAND-PASS PHASE-LOCK RECEIVER

BACKGROUND OF THE INVENTION

The elements of a typical phase-lock loop frequency modulation/phase modulation (FM/PM) receiver include an antenna, a first mixer, an IF amplifier, a reference oscillator, a second mixer, a voltage-controlled oscillator and a low-pass filter. The low-pass filter is designed to cover the whole base band including all the noise located therein.

In situations where the base band consists of a series of discrete frequency bands containing a large portion of the energy transmitted, a single low-pass filter phase-lock loop design is disadvantageous. The single filter must cover the whole base band, including all the noise located between the series of discrete frequency bands of energy.

One example of a base band structure consisting of a series of discrete frequency bands is the IRIG telemetry standard. Presently, phase-lock loops designed for this type of system utilize a single low-pass filter with its attendant failings. U.S. Pat. No. 3,346,814 to T. F. Haggai shows a conventional phase-lock loop utilizing three band-pass filters each differing in bandwidth at intermediate frequency. Means are provided for selecting the appropriate filter. Haggai, however, shows filters which are positioned prior to demodulation to base band and therefore these filters must encompass the entire received signal spectrum without the capability of selectively trapping only those base band signal frequencies containing significant energy.

In receiving a television picture, the signal transmitted consists of a series of discrete frequencies containing picture information and an audio subcarrier. Present receivers utilize a phase-lock loop instead of a standard discriminator circuit because of the low power levels. A single low-pass filter having a bandwidth wide enough to encompass the whole signal is sufficient where there is a relatively high power level. When power is low, because the single low-pass filter encompasses the whole signal, the signal-to-noise ratio suffers.

U.S. Pat. No. 3,209,271 to Sydney E. Smith shows a phase-lock loop receiver having a filter with an adjustable bandwidth. Bandwidth of the loop filter is adjusted in response to the amplitude of the signal at the input in an attempt at increasing the signal-to-noise ratio. This represents an improvement over "fixed" and "choice of one of a multiplicity of filter" systems, however, Smith does not show any method for filtering out the noise between discrete frequencies containing the informational energy.

U.S. Pat. No. 3,358,240 to George A. McKay shows a phase-lock loop receiver having a plurality of phase-lock loops. By using the output of one loop at a time, a composite characteristic is produced which extends the operating range of the phase detector portion of the loop. However, extension of the phase detector characteristic has no influence on selectively trapping desired spectral regions of the baseband.

It would be desirable to produce a phase-lock loop receiver capable of receiving certain phase or frequency modulated signals at lower power levels than conventional signal low-pass filter phase-lock loops.

A suitable design would utilize a plurality of band-pass filters to trap discrete energy throughout the base band in addition to a narrow band low-pass filter which is necessary in all phase-lock loops to maintain carrier lock. This approach traps the desired energy throughout the base band, however, it does not trap the noise found between the discrete energy bands.

SUMMARY

In accordance with an example of a preferred embodiment of the present invention, an incoming FM/PM signal at a carrier frequency is mixed with the output of a voltage controlled oscillator reducing it to a convenient intermediate frequency. The output of an IF amplifier is mixed with a reference signal to provide a phase error voltage. The error signal drives a series of band-pass and low-pass filters, the outputs of which are summed. The sum in turn drives the voltage controlled oscillator.

DESCRIPTION OF THE PREFERRED EMBODIMENT

Figures 1, 2:
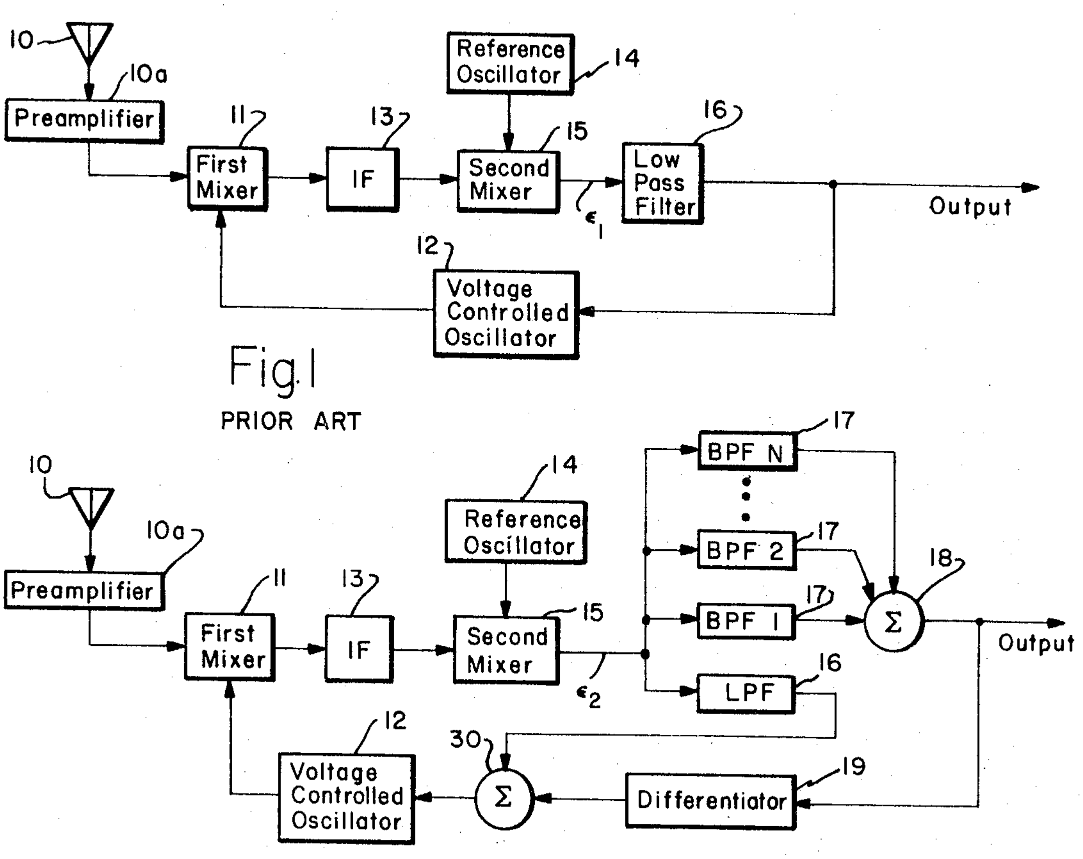
Fig.1 PRIOR ART, Fig.2
FIG. 1 is a schematic diagram of an example of a prior art receiver employing a phase-lock loop.
FIG. 2 is a schematic diagram of an example of a receiver employing a phase-lock loop including a plurality of band-pass filters according to the present invention.

An example of a prior art frequency or phase modulated (FM/PM) receiver employing a phase-lock loop is shown in FIG. 1. A signal consisting of a frequency or phase modulated carrier is received by antenna 10. This signal may be amplified by a preamplifier 10*a* to a convenient level. A first mixer 11 mixes the signal received by antenna 10 or the amplified output of preamplifier 10*a* with the output of a voltage-controlled oscillator 12 reducing the carrier to a convenient intermediate frequency. The output of first mixer 11 is amplified by IF amplifier 13 to a desirable level. A second mixer or phase detector 15 mixes the output of IF amplifier 13 with the output of a reference oscillator 14 to produce a phase error voltage $\epsilon_1$ to drive the phase-lock loop.

The output of second mixer or phase detector 15, $\epsilon_1$, is fed to a low-pass filter 16 which has a bandwidth wide enough to trap the lower base band frequencies including direct current. The output of filter 16 drives voltage controlled oscillator 12.

The output of the system may be taken at the output of low-pass filter 16.

The phase-lock loop of FIG. 1 includes low-pass filter 16 and voltage-controlled oscillator 12. Voltage-controlled oscillator 12 produces a reference signal which initially is of nearly the same frequency as that of the desired incoming signal. In the prelocked condition, when the desired signal is received, second mixer or phase detector 15 produces an error voltage at its output which drives voltage-controlled oscillator 12 toward the desired phase.

A regenerative action takes place which ends when voltage-controlled oscillator 12 produces a reference signal which is phase locked to the incoming signal but offset from the incoming frequency by the reference oscillator frequency.

The prior art phase-lock loop system described above is superior to conventional discriminators in that it can operate at much lower power levels under conditions of high modulation index. However, the circuit of FIG. 1 is disadvantageous in situations where the received signal base band consists of discrete bands of energy. When receiving such signals at low-power levels, such as from deep space, the circuit of FIG. 1 displays poor threshold performance. This is because the single low-pass filter traps all the noise in between, in addition to, the discrete energy bands.

The circuit of FIG. 2 shows one example of an improved phase-lock loop system, according to the present invention, which solves the above-stated problem.

In FIG. 2, a signal consisting of a frequency or phase modulated carrier is received by antenna 10. The received signal base band contains discrete bands of energy. A preamplifier 10*a* may be employed to amplify the signal to a suitable level. A first mixer 11 mixes the signal received by antenna 10 or the output of preamplifier 10*a* with the output of a voltage-controlled oscillator 12 reducing the carrier to a convenient intermediate frequency. The output of first mixer 11 is amplified by IF amplifier 13 to a desirable level. A second mixer or phase detector 15 mixes the output of IF amplifier 13 with the output of a reference oscillator 14 to produce a phase error voltage $\epsilon_2$ to drive the phase-lock loop.

The output of second mixer or phase detector 15, $\epsilon_2$, drives a lowupass filter 16 and a plurality of band-pass filters 17. The outputs of filters 17 are summed by a summer 18. The output of summer 18 drives a differentiator 19. The outputs of filter 16 and differentiator 19 are summed and drive voltage-controlled oscillator 12. Differentiator 19 is used to stabilize the phase-lock loop.

The output of the system may be taken at the output of summer 18 for received signals encoded in phase modulation. For signals encoded in frequency modulation, it is convenient to take the output at the input to voltage-controlled oscillator 12.

The phase-lock loop of FIG. 2 includes low-pass filter 16 and the plurality of band-pass filters 17, summers 18 and 30, differentiator 19 and voltage-controlled oscillator 12.

Assume that the signal received at antenna 10 contains energy at discrete frequencies and little energy in between the discrete frequencies and is in the form:

$$v(t)=E\sin\left[\omega_0 t+m(t)+\sum_1^N \phi_i(t)\sin[\omega_i t+\alpha_i(t)]\right]+\text{noise} \quad (1)$$

where $E$=received signal amplitude, $v$
$\omega_0$=carrier frequency, $r/s$
$m(t)$=a low-pass modulation function, $r$
$\Sigma$=N generalized modulation forms each closely grouped around the respective subcarrier frequency $\omega_i$, $r/s$ The noise term of equation (1) is the equivalent noise of all amplifiers in FIG. 2 referred to the terminals of antenna 10. The noise also includes any noise received by antenna 10 from external radiations.

Secondary demodulation of the subcarriers, $\omega_i$, in equation (1) is not treated in this application as conventional techniques are employed. The objective of this invention is primary demodulation defined as maintaining phase-lock to $v(t)$ and extracting the phase function:

$$\theta(t)=m(t)+\sum_1^N \phi_i(t)\sin[\omega_i t+\alpha_i(t)],\ r \quad (2)$$

Each band-pass filter is designed to trap a discrete energy band at frequency $\omega_i$. The low-pass filter is designed to trap the low frequency energy contained in $m(t)$ to maintain carrier lock. The outputs of all the band-pass filters 17 are summed by summer 18, and the resultant phase modulation is differentiated by differentiator 19. The output of low-pass filter 16 is summed with the output of differentiator 19 to drive voltage-controlled oscillator 12. The output of voltage-controlled oscillator 12 mixes with the incoming signal in first mixer 11 resulting in a signal in IF amplifier 13 with small resultant phase modulation. The output of IF amplifier 13 is mixed with a reference oscillator 14 by second mixer or phase detector 15. The small resultant phase error $\epsilon_2$ provides inputs to band-pass filter 17 completing the phase-lock loop. Differentiator 19 is necessary to stabilize the loop.

Figure 3:
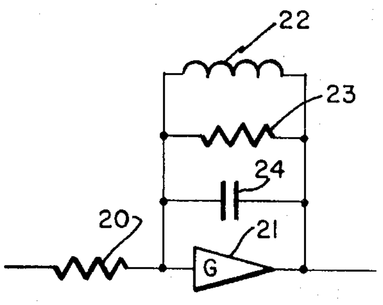
FIG. 3 is a schematic diagram of a typical band-pass filter element shown in FIG. 2.

An example of a filter which may be used as a band-pass filter 17 is shown in FIG. 3. The filter consists of a resistor 20 in series with an operational amplifier 21. An inductor 22, a resistor 23 and a capacitor 24 are shunted across operational amplifier 21.

The values of the elements for the filter are derived as follows. The transfer function of the output/input is;

$$\frac{e_o(s)}{e_i(s)}=\frac{R_{23}}{R_{20}\left[\frac{R_{23}/R_{20}}{G}+\frac{(1/G+1)}{s\left(\frac{1}{C_{24}R_{23}}\right)}\left[s^2+s\left(\frac{1}{C_{24}R_{23}}\right)+\frac{1}{L_{22}C_{24}}\right]\right]} \quad (3)$$

If $G>>>R_{23}/R_{20}>>>1$, Equation (3) becomes $$\frac{e_o(s)}{e_i(s)}=\left(\frac{R_{23}}{R_{20}}\right)\frac{s\left(\frac{1}{C_{24}R_{23}}\right)}{s^2+s\left(\frac{1}{C_{24}R_{23}}\right)+\frac{1}{L_{22}C_{24}}} \quad (4)$$

Equation (4) has the response form of a simple tuned filter having a resonant frequency at which the amplifier output is 180° out of phase with the input.

Thus:

$$\omega_r=\frac{1}{\sqrt{L_{22}C_{24}}}=2\pi f_r;\ r/s \quad (5)$$

where:

$\omega_r$=resonant frequency, $r/s$
$f_r$=resonant frequency, Hz.
$L_{22}$=tuned circuit inductance, hy.
$C_{24}$=tuned circuit capacitance, fd.

Each filter is therefore designed to select an $\omega_r=\omega_i$.

Figure 4:
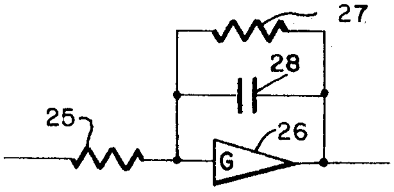
FIG. 4 is a schematic diagram of a typical low-pass filter element shown in FIG. 2.

An example of a filter which may be used as low-pass filter 16 is shown in FIG. 4. A resistor 25 is placed in series with an operational amplifier 26. A resistor 27 and a capacitor 28 are placed in parallel across operational amplifier 26. Selection of suitable elements for this type of low-pass filter is well known in the art and does not form part of the present invention. For one method of choosing the elements for low-pass filter 16, see B. D. Martin, *A Coherent Minimum-Power Lunar Probe Telemetry System*, *JPL*, California Institute of Technology, Pasadena External Publication No. 610, dated Aug. 12, 1959, pp. 41–43.

Figure 5:
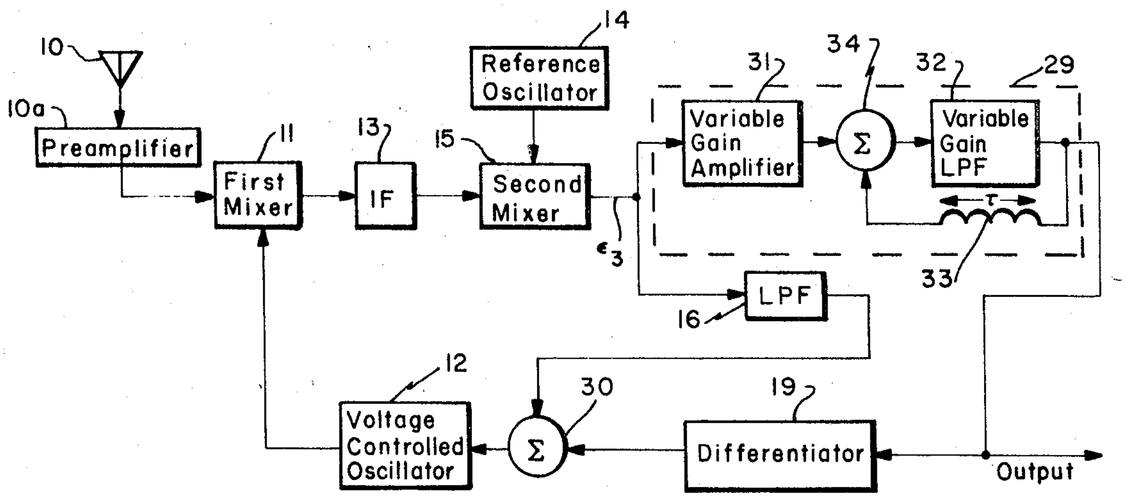
FIG. 5 is a schematic diagram of an example of a receiver employing a phase-lock loop including a delay line according to the present invention.

The circuit of FIG. 5 shows another example of an improved phase-lock loop according to the present invention.

In FIG. 5 a signal consisting of a frequency or phase modulated carrier pulse equivalent noise is received by antenna 10, and amplified by preamplifier **10*a*. The received signal baseband contains discrete bands of energy. A first mixer 11 mixes the signal received by antenna 10 with the output of a voltage-controlled oscillator 12 reducing the carrier to a convenient intermediate frequency. The output of first mixer 11 is amplified by IF amplifier 13 to a desirable level. A second mixer or phase detector mixes the output of IF amplifier 13 with the output of a reference oscillator 14** to produce a phase error voltage $\epsilon_3$ to drive the phase-lock loop.

The output of a second mixer 15, $\epsilon_3$, drives a low-pass filter 16 and a comb filter 29. The output of comb filter 29 is differentiated by differentiator 19. The outputs of low-pass filter 16 and differentiator 19 are summed by summer 30 and drive voltage-controlled oscillator 12. Differentiator 19 is used to stabilize the phase-lock loop.

The output of the system may be taken at the output of comb filter 29 for received signals encoded in phase modulation. For signals encoded in frequency modulation, it is convenient to take the output at the input to voltage-controlled oscillator 12.

The phase-lock loop of FIG. 5 includes low-pass filter 16, comb filter 29, summer 30, differentiator 19 and voltage-controlled oscillator 12.

Comb filter 29 comprises a variable gain amplifier 31, a variable gain low-pass filter 32 and a delay line 33 having a time delay of $\tau$ seconds. The output of variable gain amplifier 31 and the output of the delay line 33 are summed by a summer 34. The output of summer 34 drives the variable gain low-pass filter. The gains of amplifier 31 and low-pass filter 32 are chosen to achieve the desired bandwidth properties.

The comb filter 29 is designed to filter repetitive-type signals containing a main frequency and a series of frequencies which are multiples of the main frequency. An example of this type of signal is a television signal in which energy clusters at the line repetition rate. For optimum reception of a television signal an additional band-pass filter should be used for trapping the audio subcarrier.

Figure 6:
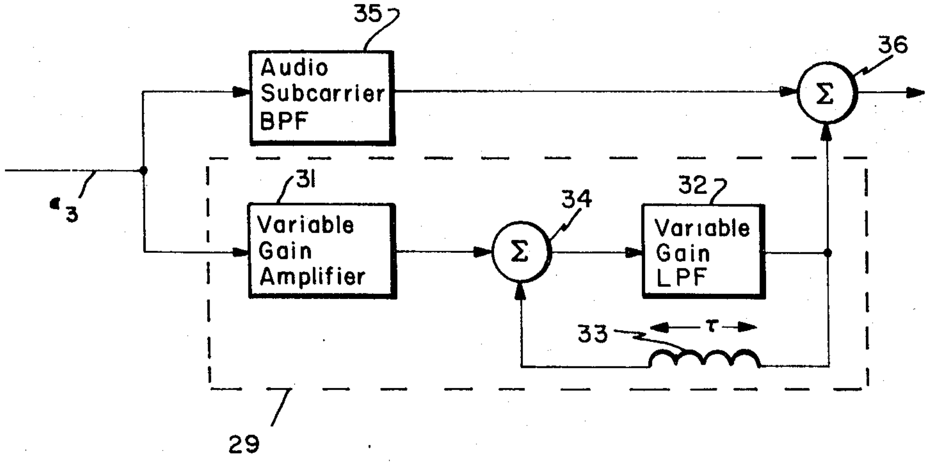
FIG. 6 is a schematic diagram of the comb filter element shown in FIG. 5.

As shown in FIG. 6, a suitable comb filter for television reception is shown. Phase error signal $\epsilon_3$ drives an audio subcarrier band-pass filter 35 in addition to variable gain amplifier 31. The output of audio subcarrier band-pass filter 35 and variable gain low-pass filter 32 are summed by summer 36 and fed to differentiator 19. The audio subcarrier is trapped by filter 35, and the video information is trapped by comb filter 29.

The comb filters shown in FIGS. 5 and 6 are designed to trap the discrete bands of energy appearing at harmonic frequencies in the base band. Low-pass filter 16 traps low frequency energy contained in the $m(t)$ term of equation (1) to maintain carrier lock. In this manner, superior phase-lock loop threshold performance is achieved as the noise appearing between the discrete energy bands is not trapped by the comb filters.

It is to be understood that the circuits of FIGS. 2 and 5 are illustrative of the type of circuits useful with this invention. The invention may also be practiced with circuits such as those utilizing multiple instead of single conversion receivers, or a frequency feedback receiver.

The concepts which form this invention may be described by specific mathematical equations. This specification teaches analog embodiments of these equations comprising physical elements, e.g. inductors, resistors, condensers delay lines, etc. It is to be further understood that digital means may be utilized to implement these equations. A digital system may, for example, sample and quantize the signal received at antenna 10 yielding a signal encoded as a series of digital words to be operated on by a digital computer programmed in accordance with the mathematical equations resulting from the band-pass filtering concepts taught by this invention.

I claim:

1. In a phase-lock loop receiver of the type used for receiving a signal base band consisting of discrete bands of energy including means for receiving the signal, means for phase detecting the received signal, and a voltage-controlled oscillator, the improvement comprising:

means for separately trapping each discrete energy band coupled between the means for phase detecting the received signal and the voltage-controlled oscillator;

a first differentiator differentiating the output of said means for separately trapping each discrete energy band;

a low-pass filter for trapping low frequency energy to maintain carrier lock; and a first summer summing the outputs of said first differentiator and said low-pass filter; so that the voltage controlled oscillator driven by said first summer and the output of the voltage-controlled oscillator mixes with the received signal to complete the phase-lock loop.

2. The improvement claimed in claim 1 wherein said means for separately trapping each discrete energy band includes:

a plurality of band-pass filters, one for each discrete energy band.

3. The improvement claimed in claim 1 wherein said means for separately trapping each discrete energy band comprises:

a plurality of band-pass filters, one for each discrete energy band;

second summer summing the outputs of said band-pass filters; and said first differentiator differentiating to output of said second summer.

4. The improvement claimed in claim 1 wherein said means for separately trapping each discrete energy band includes:

a comb filter.

5. The improvement claimed in claim 4 wherein said comb filter comprises:

a variable gain amplifier;

a variable gain low-pass filter;

a delay line driven by said low-pass filter;

a third summer for summing the outputs of said variable gain amplifier and said delay line; and said third summer driving said variable gain low-pass filter.

6. The improvement claimed in claim 1 wherein said means for separately trapping each discrete energy band comprises:

a comb filter comprising, a variable gain amplifier, a variable gain low-pass filter, a delay line driven by said low-pass filter, a third summer for summing the outputs of said variable gain amplifier and said delay line, and said third summer driving said variable gain low-pass filter; and said first differentiator differentiating the output of said comb filter.

7. A phase-lock loop receiver for receiving a base band signal consisting of discrete energy bands comprising:

means for receiving said signal;

a voltage-controlled oscillator;

a first mixer, coupled to said means for receiving said signal and said oscillator, said first mixer mixing the received signal and the output of said voltage-controlled oscillator;

a stable reference oscillator;

a second mixer, coupled to the output of said first mixer and said reference oscillator, said second mixer mixing the output of said first mixer with the output of said reference oscillator;

means for separately trapping each discrete energy band of said base band signal, said means driven by said second mixer;

a first differentiator differentiating the output of said means for separately trapping each discrete energy band;

a low-pass filter driven by said second mixer for trapping low frequency energy in the base band and for maintaining carrier lock;

a first summer summing the outputs of said first differentiator and said low-pass filter; and said voltage-controlled oscillator driven by the output of said first summer.

8. A phase-lock loop receiver as claimed in claim 7 wherein said means for separately trapping each discrete energy band includes:

a plurality of band-pass filters, one for trapping each discrete energy band.

9. A phase-lock loop receiver as claimed in claim 7 wherein said means for separately trapping each discrete energy band comprises:

a plurality of band-pass filters driven by the output of said second mixer, one band-pass filter for trapping each discrete energy band of said base band;

a second summer summing the outputs of said band-pass filters; and said first differentiator differentiating the output of said second summer.

10. A phase-lock loop receiver as claimed in claim 7 wherein said means for separately trapping each discrete energy band includes:

a comb filter.

11. A phase-lock loop receiver as claimed in claim 7 wherein said means for separately trapping each discrete energy band comprises:

a comb filter, said comb filter driven by said second mixer and comprising:

a variable gain amplifier, a variable gain low-pass filter, a third summer for summing the outputs of said variable gain amplifier and said delay line, and said third summer driving said variable gain low-pass filter; and said first differentiator differentiating the output of said comb filter.

* * * * *